United States Patent
Hambrick et al.

(10) Patent No.: US 8,001,158 B2
(45) Date of Patent: Aug. 16, 2011

(54) SYSTEMS AND PROCESSES FOR EVALUATING DATABASE COMPLEXITIES

(75) Inventors: Craig B. Hambrick, Beavercreek, OH (US); Babak Makkinejad, Troy, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 783 days.

(21) Appl. No.: 11/956,267

(22) Filed: Dec. 13, 2007

(65) Prior Publication Data

US 2009/0157598 A1 Jun. 18, 2009

(51) Int. Cl.
*G06F 17/27* (2006.01)
*G06F 7/00* (2006.01)
(52) U.S. Cl. ........................................................ 707/802
(58) Field of Classification Search .................. 707/790, 707/802, 803
See application file for complete search history.

(56) References Cited

U.S. PATENT DOCUMENTS

| | | | |
|---|---|---|---|
| 7,752,199 B2* | 7/2010 | Farrell | 707/723 |
| 2003/0097294 A1* | 5/2003 | Gordon | 705/10 |
| 2003/0097320 A1* | 5/2003 | Gordon | 705/35 |
| 2004/0078353 A1* | 4/2004 | Brock et al. | 707/1 |
| 2005/0144555 A1* | 6/2005 | Morris | 715/513 |
| 2005/0234960 A1* | 10/2005 | Chickering et al. | 707/102 |
| 2006/0010106 A1* | 1/2006 | Gerea et al. | 707/3 |
| 2006/0224522 A1* | 10/2006 | Wald | 705/59 |
| 2007/0282876 A1* | 12/2007 | Diao et al. | 707/101 |
| 2008/0215404 A1* | 9/2008 | Diao et al. | 705/7 |
| 2008/0256111 A1* | 10/2008 | Haham et al. | 707/102 |
| 2009/0138843 A1* | 5/2009 | Hinton et al. | 717/101 |

* cited by examiner

*Primary Examiner* — Angela M Lie

(57) ABSTRACT

A database may be evaluated to determine the complexity of the database. Metadata associated with a database may be retrieved and database information may be identified from the retrieved metadata. Database information may include, for example, a number of tables, a number of attributes of a table, a number of relationships in a table, or a number of records in a table of a database. A database complexity score may be determined based on identified database information.

20 Claims, 2 Drawing Sheets

SYSTEMS AND PROCESSES FOR EVALUATING DATABASE COMPLEXITIES

TECHNICAL FIELD

The present invention relates to evaluating the complexity of a database.

BACKGROUND

Databases vary in size and complexity. The complexity of a database may not often be apparent from the total size (e.g., memory size) of the database. Often the complexity of a database depends on the number of tables in a database, the relationships between nodes of data, the structure of the data (e.g., hierarchical) within the database, etc. Currently, databases are evaluated based on past experience with similar databases or the judgment of the evaluator. However, since each person may have different experiences and judgment, two people may evaluate a database as having different levels of complexity.

SUMMARY

In one general aspect, metadata associated with a database is retrieved and database information is identified from the retrieved metadata. The database information includes at least two of a quantity of tables, a quantity of attributes of a table, a quantity of types of attributes, a quantity of relationships in a table, or a quantity of records in a table of a database. A database complexity score is determined based on the identified database information. The database complexity score is a weighted function of the database information and the weight applied to each item of the database information is predetermined.

Various implementations may include one or more features. A report based on the database complexity score may be generated. A reduced database complexity score may be determined by applying a function to the database score configured to modify the database complexity score such that the value of the database complexity score is reduced. The reduced database complexity score may include the natural logarithm or logarithm of the database complexity score. The database information may include at least one of a quantity of views, a quantity of stored procedures, a foreign key multiplier, or a quantity of tables larger than a specified size. The database information may include a quantity of tables, a quantity of attributes of a table, a quantity of relationships in a table, and a quantity of records in a table of a database. The weighted function may include a summation of the natural logarithm of each identified database information. The weighted function may include a weighted summation of each identified database information. The weighted function may include a summation of the quantity of rows divided by a row multiplier, a quantity of columns divided by a column multiplier, a product of a quantity of foreign keys and a foreign key multiplier, a product of a quantity of indexes and an index multiplier, and a product of a number of triggers (e.g., a procedural code automatically executed in response to certain events on a particular table in a database and/or may restrict access to specific data, perform logging, or audit data modifications) and a trigger multiplier.

In another general aspect, metadata associated with a database is retrieved and database information is identified from the retrieved metadata. The identified database information is numerical information and includes at least two of a quantity of tables, a quantity of attributes of a table, a quantity of types of attributes, a quantity of relationships in a table, and a quantity of records in a table of a database. A database complexity score is determined based on the identified database information. The database score is a function of the database information and the function includes a summation of the square of a table score for each table of the database.

Various implementations may include one or more features. The table score for a table may include the square root of product of the natural logarithm of a quantity of rows in the table and the natural logarithm of a quantity of attributes of the table. A reduced database complexity score may be determined by applying a function to the database score that is configured to modify the database complexity score such that the value of the database complexity score is reduced. The database information may include at least one of a quantity of views, a quantity of stored procedures, a foreign key multiplier, or a quantity of tables larger than a predetermined size. The database information may include a quantity of tables, a quantity of attributes of a table, a quantity of relationships in a table, and a quantity of records in a table of a database. The database score may be a function of a quantity of types of database information. The function may include a summation of the product of a table score for a parent table and a table score for a child score for each child table in the database.

In another general aspect, metadata associated with a database is retrieved and database information is identified from the retrieved metadata. The identified database information is numerical information and includes at least one of a quantity of tables, a quantity of attributes of a table, a quantity of types of attributes, a quantity of relationships in a table, or a quantity of records in a table of a database. A database complexity score may be determined based on the identified database information, where the database score is a function of the database information.

Various implementations may include one or more features. The database score may be a function of a complexity of tables in the database, a complexity of relationships in tables in the database, and a complexity of stored procedures. The complexity of a table may be a function of table information, the complexity of relationships may be a function of properties of a relation, and the complexity of stored procedures may be a function of properties of procedures in the database. The database score may be a function of the quantity of tables and the complexity of each table in the database, where the complexity of a table is a function of the table information. The database score may be a function at least one type of database information and a complexity of each item of the type of database information.

The details of one or more implementations are set forth in the accompanying drawings and the description below. Other features, objects, and advantages of the implementations will be apparent from the description and drawings, and from the claims.

DESCRIPTION OF DRAWINGS

Like reference symbols in the various drawings indicate like elements.

DETAILED DESCRIPTION

Enterprises often have or manage many databases. Evaluating the resources involved in managing the databases is often difficult without an objective measure of the complexity of the database. Subjective evaluation may allow two similar databases to be classified as having very different complexities, which may cause inefficient allocation of resources (e.g., labor), inaccurate evaluation of tasks (e.g., software updates, database migrations), etc. For example, if an enterprise would like to outsource management of databases, an objective measure of the complexity of the databases of the enterprise would increase accuracy in management costs and resource (e.g., time and labor) allocation. Thus, by providing an objective measure of database complexity, such as through a database complexity score, a more accurate evaluation of the database may be obtained and resources may be more effectively managed and tracked.

Figure 1:
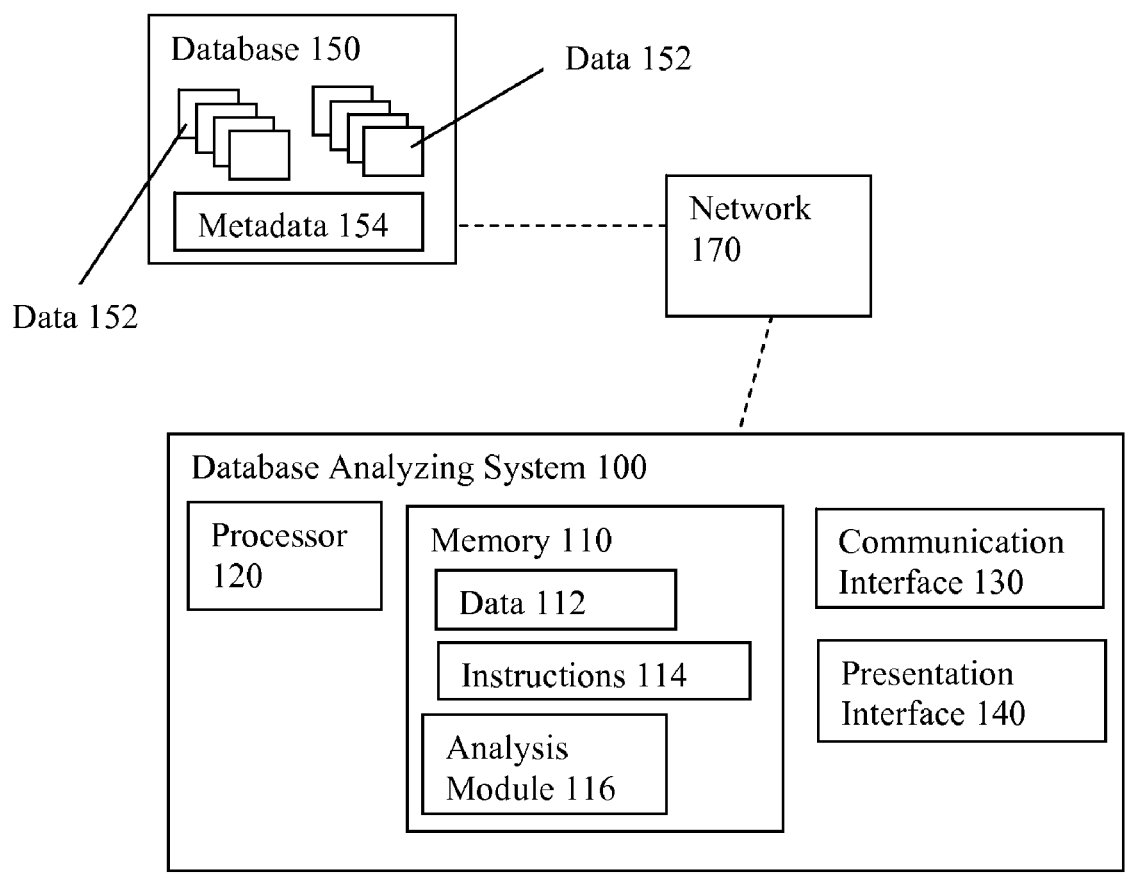
FIG. 1 illustrates an example of a system for evaluating database.

FIG. 1 illustrates a system for evaluating database complexity that includes a database analyzing system 100. The database analyzing system 100 includes a memory 110 that stores data 112, instructions 114, and an analysis module 116. Data 112 may include, for example, database information, metadata retrieved from databases, database complexity scores and/or an identification of the corresponding databases, multipliers used in determining a database complexity score and/or any other appropriate information. The instructions 114 may include the operating system and/or other software modules executable by the processor. For example, the instructions may include the functions used for determining the database complexity score and/or when to apply various functions used to determine the database complexity score. The analysis module 116 is executable by the processor to identify database information for a database and determine a database complexity score. The analysis module 116 may also retrieve metadata associated with a database. Other modules may also be stored in the memory 110, such as, for example, a presentation module that is executable to generate reports based on a database complexity score, to generate interfaces to facilitate user interaction, and/or to generate interfaces to present various information (e.g., database complexity scores, reports, database information, etc.).

The database analyzing system 100 includes a communication interface 130 that allows the system to communicate with other systems and/or memories. For example, the database analyzing system 100 may retrieve metadata 154 or other data 152 from a database 150 to be evaluated. The database analyzing system 100 may be communicably coupled to the database 150 through a network 170 or directly coupled to the database. The metadata 154 of the database 150 may include database information such as a number of tables, a number and/or types (e.g., date, string, integer, etc.) of attributes of a table, a number and/or types (e.g., parent/child, sibling, etc.) of relationships in a table, a number of records in a table of a database, number of views, a number of stored procedures (e.g., operations that may be performed on the database), the number of lines of codes in a stored procedure, a foreign key multiplier (e.g., a numerical multiplier applied when foreign language data exists in a database), a number of tables larger than a specified size (e.g., tables with more than 1 million rows), a number of rows in a table, a number of columns in a table, a number of indexes, a number of triggers in a database, a number of records in a database, a number of types of database information, and/or other information about the database.

The database analyzing system 100 may also include a presentation interface 140 to present, for example, metadata obtained from a database, database information, a database complexity score, reports, and/or other information to a user.

Figure 2:
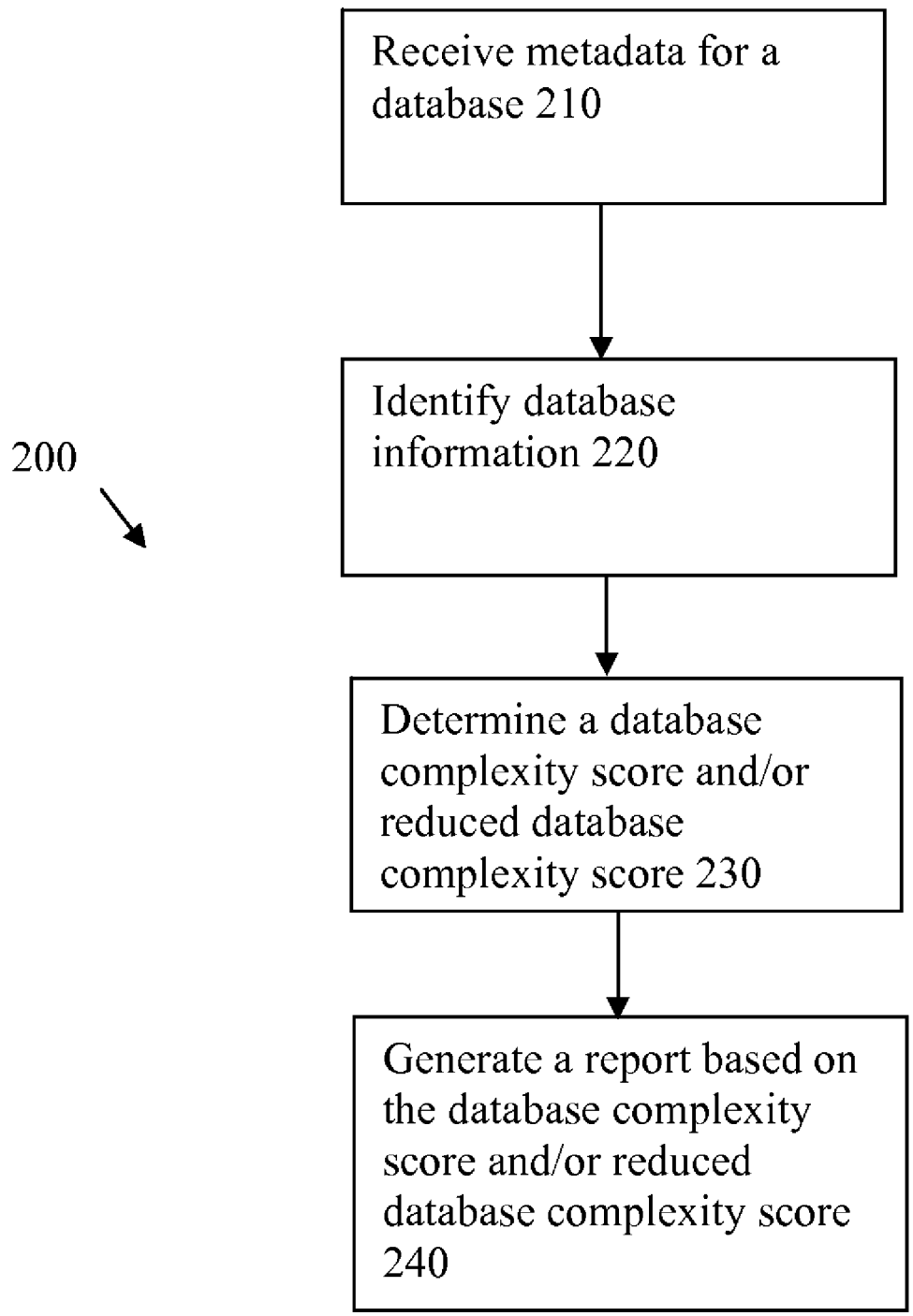
FIG. 2 illustrates an example process for evaluating a complexity of a database.

FIG. 2 illustrates a process 200 for evaluating a complexity of a database that may be performed by systems, such as the system illustrated in FIG. 1. Metadata for a database may be received (operation 210). For example, metadata for a database may be obtained and provided to the database analyzing system (e.g., via an interface generated by the database analyzing system). As another example, a database analyzing system may be communicably coupled to the database and may retrieve the metadata from the database.

Database information may be identified (operation 220). For example, the metadata received may include the database information or information about the database from which the database information may be determined. Database information may include, for example, a number (or quantity) of tables, a number of attributes of a table, a number of relationships in a table, a number of records in a table of a database, number of views, a number of stored procedures, a foreign key multiplier, a number of tables larger than a specified size, and/or other information about the database.

A database complexity score and/or reduced database complexity score may be determined based on the database information (operation 230). The database information may be numerical or numerically represented. For example, the presence of or the presence of a specified amount of foreign language text in a database may be correlated to a numerical value. The database complexity score may be a function of the database information. In some implementations, a reduced database score may be determined based on the database score. A function (e.g., logarithm, natural logarithm, square root, etc.) may be applied to a database score to reduce the value of the database score. A reduced database score may allow a specified range of scores to be obtained that is less than the range of database complexity scores. For example, the range of database complexity scores may be from 1 to 10,000; however the range of reduced database complexity scores may be from 0 to 100. A scale may be selected, such as 0 to 100 or 0 to 10, that facilitates user understanding of the score (e.g., due to familiarity with the commonly used scale range). The reduced database complexity score may be easier for a user to comprehend and/or evaluate. The reduced database complexity score may be, for example, the logarithm or natural logarithm of the database complexity score. As another example, the reduced database complexity score may be obtained by obtaining the logarithm or natural logarithm of each element (e.g., table score, number of rows, etc.) of the function used to determine the database complexity score.

A report may be generated based on the database complexity score and/or reduced database complexity score (operation 240). The report may include, for example, the database complexity and/or reduced database complexity score for a database and/or other databases, identification of other databases with similar database complexity scores, database information, and/or metadata retrieved from the database. The report may include graphs based on the database complexity score and/or other database complexity scores. The report may be presented on an interface generated by the database analyzing system. The interface may be presented to a user (e.g., via a website, downloaded from the database analyzing system, etc.).

Process 200 may be implemented by system 100 or similar systems. In addition, various operations may be added, deleted, modified, or reordered in process 200. For example, a report may not be generated. As another example, the database score may be presented to a user. In addition, an interface for receiving information from a user (e.g., metadata from a database) may be generated. As another example, an interface for presenting the database complexity score and/or report may be generated. Furthermore, the database analyzing system may be communicably coupled to the database to be evaluated.

The database complexity score may provide an objective and reproducible measure of the complexity of a database and thus allow a user to compare various databases objectively. The database complexity score is a function of database information. The types of database information used to determine the database complexity score may vary based on, for example, database information available, the type of database (e.g., relational), and/or business standards (e.g., a business may base database complexity scores on tables information but not the presence of foreign language data). In addition, the function used to determine the database complexity score may vary.

For example, the database complexity score may be a weighted function where a specified weight is applied to each item of database information. The weight may be retrieved from a memory coupled to the database analysis system.

The database complexity score may be a weighted of database information, such as number of tables, attributes, types of attributes, relationships in a table, and records. The database complexity score may be the summation of each item of database information times a multiplier. The multiplier may be specified or predetermined. A reduced database complexity score may be the summation of the natural logarithm or logarithm of each of the items of database information.

The database complexity score may be based on the summation of the square of a table score for each table of a database. The database complexity score may also be based on other database information, such as the number of types of database information and/or a summation of the product of a table score for a parent table score and a child table score for each child table in the database.

The database complexity score may be a summation of table scores for each table in the database. The table score may be a function of table information such as, a number of attributes of a table, a number of relationships in a table, a number of records in a table, number of views, a number of stored procedures, a foreign key multiplier, and/or other information about the database. For example, the table score may be determined using the following function:

Table score=(number of rows/row multiplier)+(number of columns/column multiplier)+(number of foreign keys*foreign key multiplier)+(number of indexes*index multiplier)+(number of triggers*trigger multiplier)+(number of stored procedures*procedures multiplier).

And, for example, the database complexity score may be determined using the following function:

Database complexity score=Σ Table score(s)

As another example the database score may be determined using one or more of the following functions:

Database complexity score=Σ Table scores²+(number of types of database information)*(Table score$_2$*Table score$_1$+ . . . +Table score$_n$*Table score$_{n-1}$)+(Table score$_{Parent\ of\ Child\ 1}$*Table score$_{Child\ 1}$+ . . . +Table score$_{Parent\ of\ Child\ n}$*Table score$_{Child\ n}$)

where,

Table score=number of rows*(number of attributes).

To obtain a reduced database complexity score, a table score may be determined as follows:

Table score=square root((1$n$(number of rows))*1$n$ (number of attributes).)

In some implementations, the database complexity score may be a function of the complexity of database information, such as the complexity of tables, the complexity of relations, and the complexity of stored procedures. The complexity of a type of database information may be a function of the number of items of the specified type of database information and the complexity of each item of the specified type of database information.

For example, the complexity of tables may be a function of the number of tables and the complexity of each table. The complexity of tables may be a summation or weighted summation of the number of tables and complexity of each table. The complexity of each table may be similar to a table score or other function of the properties of a table such as number or rows, number of columns, number of foreign keys (e.g., foreign language data), number of triggers, etc.

As another example, the complexity of relations may be a function of the number of relations in a database and the complexity of each relation. The complexity of relations may be a summation or weighted summation of the number of relations and complexity of each relations. The complexity of each relation may be a function of properties of the relation.

As another example, the complexity of stored procedures may be a function of the number of stored procedures in a database and the complexity of each stored procedures. The complexity of stored procedures may be a summation or weighted summation of the number of stored procedures and complexity of each stored procedures. The complexity of each stored procedures may be a function of properties of the relation (e.g., number of lines of codes).

As another example, the database complexity score may be determined as using one or more of the following functions:

Database Complexity=function$_1$(Complexity of Tables, Complexity of Relations, Complexity of Stored Procedures, . . . )

Complexity of Tables=function$_2$(Number of Tables, Complexity of TableA, Complexity of TableB, Complexity of TableC, . . . )

Complexity of Relations=function$_3$(Number of Relations, Complexity of RelationA, Complexity of RelationB, Complexity of RelationC, . . . )

Complexity of Stored Procedures=function$_4$(Number of Stored Procedures, Complexity of Stored ProcedureA, Complexity of Stored ProcedureB, Complexity of Stored ProcedureC, . . . )

Complexity of A Table=function$_5$(properties of the table)

Complexity of A Relation=function$_6$(properties of the relation)

Complexity of A Stored Procedure=function$_7$(properties of the stored procedure)

A reduced database complexity score may be determined, for example, by obtaining the natural logarithm or logarithm of each of the determined complexities of database information.

Although the examples of database complexity score functions illustrated include specified sets of database information, other types of database information may be added or deleted to the function (e.g., based on database information available, the type of database, or the use of the database score). For example, when determining table scores, a number of triggers may not be included in the function. As another example, when determining table scores, a multiplier may be applied when a table is greater than a specified size (e.g., more than 1 million rows or more than 1 million columns). In addition, database complexity scores may be based on the number of indexes and/or the number of views.

In some implementations, the database analyzing system (e.g., a laptop or a personal digital assistant) may be communicably coupled to the database(s) being analyzed. The database analyzing system may automatically retrieve the database metadata from the database(s) and then analyze the database metadata to identify database information and determine database complexity score(s).

In some implementations, the database analyzing system may generate an interface to facilitate user interaction. The interface may be accessible through the Internet, for example. Metadata may be obtained through the interface. For example, metadata for a database may be uploaded to the database analyzing system through the interface. As another example, the user may provide database information through the interface. The database analyzing system may then determine the database complexity score and/or reduced database complexity score and generate a report based on the database complexity score and/or reduced database complexity score. The report may be presented to the user through the interface.

Although users have been described as a human, a user may be a person, a group of people, a person or persons interacting with one or more computers, and/or a computer system. Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user by an output device can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. Accordingly, other implementations are within the scope of this application.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "an attribute" includes a combination of two or more attributes and reference to "a database" includes different types of databases.

What is claimed is:

1. A computerized method of evaluating a complexity of a database, the method comprising:
    retrieving metadata associated with a database, the database being a large collection of data organized for rapid search and retrieval by a computer;
    identifying database information from the retrieved metadata, wherein the identified database information comprises numerical information, and wherein the database information includes at least two of a quantity of tables, a quantity of attributes of a table, a quantity of types of attributes, a quantity of relationships in a table, or a quantity of records in a table of a database;
    determining a database complexity score based on the identified database information, wherein the database complexity score comprises a weighted function of the database information, and wherein the weight applied to each item of the database information is predetermined.

2. The method of claim 1 further comprising generating a report based on the database complexity score.

3. The method of claim 1 further comprising determining a reduced database complexity score by applying a function to the database score configured to modify the database complexity score such that the value of the database complexity score is reduced.

4. The method of claim 3 wherein the reduced database complexity score comprises the natural logarithm or logarithm of the database complexity score.

5. The method of claim 1 wherein the database information includes at least one of a quantity of views, a quantity of stored procedures, a foreign key multiplier, or a quantity of tables larger than a specified size.

6. The method of claim 1 wherein the database information includes a quantity of tables, a quantity of attributes of a table, a quantity of relationships in a table, and a quantity of records in a table of a database.

7. The method of claim 1 wherein the weighted function includes a summation of the natural logarithm of each identified database information.

8. The method of claim 1 wherein the weighted function includes a weighted summation of each identified database information.

9. The method of claim 1 wherein the weighted function includes a summation of the quantity of rows divided by a row multiplier, a quantity of columns divided by a column multiplier, a product of a quantity of foreign keys and a foreign key multiplier, a product of a quantity of indexes and an index multiplier, and a product of a quantity of triggers and a trigger multiplier.

10. A computerized method of evaluating a complexity of a database, the method comprising:
retrieving metadata associated with a database;
identifying database information from the retrieved metadata, wherein the identified database information comprises numerical information, and wherein the database information includes at least two of a quantity of tables, a quantity of attributes of a table, a quantity of types of attributes, a quantity of relationships in a table, or a quantity of records in a table of a database;
determining a database complexity score based on the identified database information, wherein the database score comprises a function of the database information, wherein the function includes a summation of a square of a table score for each table of the database.

11. The method of claim 10 wherein the table score for a table includes a square root of a product of the natural logarithm of a quantity of rows in the table and the natural logarithm of a quantity of attributes of the table.

12. The method of claim 10 further comprising determining a reduced database complexity score by applying a function to the database score configured to modify the database complexity score such that the value of the database complexity score is reduced.

13. The method of claim 10 wherein the database information includes at least one of a quantity of views, a quantity of stored procedures, a foreign key multiplier, or a quantity of tables larger than a predetermined size.

14. The method of claim 10 wherein the database information includes a quantity of tables, a quantity of attributes of a table, a quantity of relationships in a table, and a quantity of records in a table of a database.

15. The method of claim 10 wherein the database score is a function of a quantity of types of database information.

16. The method of claim 10 wherein the function includes a summation of the product of a table score for a parent table and a table score for a child score for each child table in the database.

17. An article of manufacture comprising a computer readable medium storing instructions operable to cause one or more apparatus to perform operations comprising:
retrieving metadata associated with a database, the database being a large collection of data organized for rapid search and retrieval by a computer;
identifying database information from the retrieved metadata, wherein the identified database information comprises numerical information, and wherein the database information includes at least one of: a quantity of tables, a quantity of attributes of a table, a quantity of types of attributes, a quantity of relationships in a table, or a quantity of records in a table of a database;
determining a database complexity score based on the identified database information, wherein the database score comprises a function of the database information.

18. The article of claim 17 wherein the database score comprises a function of a complexity of tables in the database, a complexity of relationships in tables in the database, and a complexity of stored procedures, wherein the complexity of a table is a function of table information, and wherein the complexity of relationships is a function of properties of a relation, and wherein the complexity of stored procedures is a function of properties of procedures in the database.

19. The article of claim 17 wherein the database score is a function of the quantity of tables and the complexity of each table in the database, wherein the complexity of a table is a function of the table information.

20. The article of claim 17 wherein the database score is a function at least one type of database information and a complexity of each item of the type of database information.

* * * * *